(12) United States Patent
Fonnelop et al.

(10) Patent No.: US 9,399,555 B2
(45) Date of Patent: Jul. 26, 2016

(54) CONVEYOR MODULE DOCKING SYSTEM FOR A REVERSE VENDING MACHINE

(71) Applicant: TOMRA SYSTEMS ASA, Asker (NO)

(72) Inventors: Brynjar Aarseth Fonnelop, Asker (NO); Geir Saether, Asker (NO)

(73) Assignee: TOMRA SYSTEMS ASA, Asker (NO)

( * ) Notice: Subject to any disclaimer, the term of this patent is extended or adjusted under 35 U.S.C. 154(b) by 0 days.

(21) Appl. No.: 14/435,008

(22) PCT Filed: Oct. 30, 2013

(86) PCT No.: PCT/EP2013/072685
§ 371 (c)(1),
(2) Date: Apr. 10, 2015

(87) PCT Pub. No.: WO2014/067983
PCT Pub. Date: May 8, 2014

(65) Prior Publication Data
US 2015/0259151 A1  Sep. 17, 2015

(30) Foreign Application Priority Data

Oct. 30, 2012 (EP) .................................. 12190626

(51) Int. Cl.
*B65G 37/00* (2006.01)
*B65G 47/24* (2006.01)
(Continued)

(52) U.S. Cl.
CPC ................ *B65G 23/22* (2013.01); *B65G 15/12* (2013.01); *B65G 21/06* (2013.01); *B65G 37/005* (2013.01); *G07F 7/06* (2013.01); *G07F 7/0609* (2013.01)

(58) Field of Classification Search
CPC ............................. G07F 7/0609; B65G 37/005
See application file for complete search history.

(56) References Cited

U.S. PATENT DOCUMENTS

| | | | |
|---|---|---|---|
| 4,472,819 A | 9/1984 | Constantino | |
| 5,934,440 A * | 8/1999 | Kroghrud | ............... B07C 5/126 194/212 |

(Continued)

FOREIGN PATENT DOCUMENTS

| | | |
|---|---|---|
| DE | 36 35 065 A | 8/1987 |
| DE | 202 05 428 U | 8/2002 |

(Continued)

OTHER PUBLICATIONS

International Search Report (PCT/ISA/210) mailed on Jan. 23, 2014, by the European Patent Office as the International Searching Authority for International Application No. PCT/EP2013/072685.

(Continued)

*Primary Examiner* — Thomas Randazzo
(74) *Attorney, Agent, or Firm* — Buchanan Ingersoll & Rooney P.C.

(57) ABSTRACT

A conveyor module for a reverse vending machine, which is mountable to a docking unit, and includes at least one conveyor belt; a housing for supporting the at least one conveyor belt, and a force receiving element for receiving a driving power for driving the at least one conveyor belt, which force receiving element is accessible from outside of the conveyor module through an opening in the housing. Further, a docking unit for a conveyor module of a reverse vending machine includes a housing, and a force feed element for outputting a driving power to the conveyor module, which force feed element is accessible from outside of the docking unit through an opening in the housing.

22 Claims, 7 Drawing Sheets

(51) Int. Cl.
*B65G 23/22* (2006.01)
*B65G 21/06* (2006.01)
*G07F 7/06* (2006.01)
*B65G 15/12* (2006.01)

(56) References Cited

U.S. PATENT DOCUMENTS

| | | | | |
|---|---|---|---|---|
| 6,678,578 B2 * | 1/2004 | Holmen | ................ | B07C 5/3408 |
| | | | | 198/370.07 |
| 6,776,279 B2 * | 8/2004 | Krull | ...................... | B65G 47/24 |
| | | | | 198/626.1 |
| 7,407,056 B2 * | 8/2008 | Lutz | .................... | B65G 37/005 |
| | | | | 198/626.1 |
| 7,467,705 B2 * | 12/2008 | Lutz | ...................... | B65G 17/24 |
| | | | | 198/408 |
| 8,851,265 B2 * | 10/2014 | Morishita | ................. | B08B 3/02 |
| | | | | 194/208 |
| 2004/0211649 A1 | 10/2004 | Bonifer et al. | | |
| 2006/0252591 A1 | 11/2006 | Winkelmolen et al. | | |
| 2008/0073185 A1 | 3/2008 | Brayman et al. | | |
| 2011/0303434 A1 | 12/2011 | Wheeler et al. | | |
| 2014/0048391 A1 * | 2/2014 | Beyer | ..................... | B07C 5/122 |
| | | | | 198/836.1 |

FOREIGN PATENT DOCUMENTS

| | | | | |
|---|---|---|---|---|
| DE | 102004054284 A1 * | 5/2006 | ........... | B65G 47/248 |
| DE | 20 2006 018 119 U1 | 2/2007 | | |
| DE | 20 2008 011 613 U | 3/2010 | | |
| EP | 0 146 496 A | 6/1985 | | |
| EP | 1 101 715 A | 5/2001 | | |
| EP | 1 473 259 A | 11/2004 | | |

OTHER PUBLICATIONS

Written Opinion (PCT/ISA/237) mailed on Jan. 23, 2014, by the European Patent Office as the International Searching Authority for International Application No. PCT/EP2013/072685.

International Preliminary Report on Patentability (PCT/IPEA/409) mailed on Jan. 28, 2015, by the European Patent Office as the International Searching Authority for International Application No. PCT/EP2013/072685.

Office Action (Communication pursuant to Article 94(3) EPC) issued on Jun. 5, 2016, by the European Patent Office in European Patent Application No. 13 785 445.1-1707 (6 pages).

* cited by examiner

CONVEYOR MODULE DOCKING SYSTEM FOR A REVERSE VENDING MACHINE

The invention relates to a conveyor module, a docking unit, and a conveyor module docking system for a reverse vending machine.

BACKGROUND OF THE INVENTION

Reverse vending machines are commonly used for example in supermarkets to receive and scan used beverage containers, such as plastic bottles, glass bottles or cans. The scan is usually conducted while the used beverage container lies on conveyor belts which are provided for conveying the container into the reverse vending machine. In order to access the bar code printed on the used beverage container, usually additional to the conveyor belts, driven wheels are provided in between the conveyor belts to rotate the containers about their longitudinal axes. Based on the scan results, the used beverage containers are either accepted or rejected by the reverse vending machine. In case they are accepted, a conveyor belt feeds them into the reverse vending machine, where they may be sorted, sequenced etc. In case they are rejected, the conveyor belt is reversed and feeds the used beverage container out of the reverse vending machine back to the consumer.

Due to contamination of the conveyor belts, the reliability of the reverse vending machines might decrease over time. Cleaning of the conveyor belts might be troublesome, because they are not fully accessible.

SUMMARY OF THE INVENTION

The present invention provides a conveyor module, a docking unit, and a conveyor module docking system for a reverse vending machine which may improve maintainability and serviceability.

In this invention "detachably mountable" means that the detachable mountability is realized only with integral parts of the conveyor module and the docking unit. In other words, the conveyor module is detachably mountable to the reverse vending machine exclusively by attachment means which are integral parts of the conveyor module and which attachment means are adapted to interact with corresponding integral attachment means of the docking unit. Thus, the conveyor module can be mounted to the docking unit screwless, i.e. without the need of any screws for attachment. This also means that the conveyor module can be mounted to the docking unit toolless, i.e. without the need of any external tools for loosening attachment means. In other words, this means that the attachment means are free of loose or removable parts. This includes for example one or a combination of a snap connection, a magnetic connection, a connection by interaction of housing parts, and/or a connection which can be released by pushing a button at the conveyor module or the docking unit. The term "mountable" is broader than the above defined meaning and also including a mountability by screws etc.

The term "detachably holding" corresponds to the above meaning of "detachably mountable", just from the perspective of the docking unit which is receiving the conveyor module.

In contrast to the above, the term "reversible attachment" means that attachment may be realized by using secondary fixation means, like screws, but that the attachment could be loosened, for example by taking off the screws. Permanent attachment like gluing or welding is not meant to be within the meaning of a reversible attachment. Further, the attachment can be loosened without destroying the attached objects.

In this description, the "longitudinal direction" of the conveyor module is basically the direction of the longer dimensional extent of the conveyor module, as the skilled person would easily understand. In particular, the "longitudinal direction" is perpendicular to the vertical axis (gravity force direction) when the conveyer module is mounted on the docking unit and parallel to the longitudinal direction of the docking unit.

The term "laterally", as the skilled person easily understands, is to be understood as sideways meaning the direction which corresponds to the direction being perpendicular to the longitudinal direction of the respective object and perpendicular to the vertical. For example, in case of the conveyor module, the lateral direction is perpendicular to the surfaces of the housing walls (reference numeral 40 in FIG. 11), assumed the two housing walls are parallel to each other. For example, in case of the docking unit, the lateral direction is perpendicular to the longitudinal direction of the cuboid base body and in parallel to the receiving surface (reference numeral 8 in FIG. 1).

The term "conveying direction" corresponds to a line along which an object would be conveyed by the conveyor belts.

According to an embodiment of the invention a conveyor module for a reverse vending machine is provided, wherein the conveyor module is mountable to a docking unit, the conveyor module comprising at least one conveyor belt; a housing for supporting the at least one conveyor belt, and a force receiving element for receiving a driving power for driving the at least one conveyor belt, which force receiving element is accessible from outside of the conveyor module through an opening in the housing. This has the benefit that a drive train for driving the conveyor belt is separated into a driving part (in the docking unit) and a driven part (in the conveyor module). This way, the conveyor module is lighter and no electrical power for the motor has to be transferred to the conveyor module. It allows the conveyor module to be structured simpler. Thus, a frequent or every day detachment of the conveyor module, e.g. for cleaning, is improved. It also makes the conveyor module cheaper in case it has to be replaced.

According to a further embodiment of the invention, the conveyor module is detachably mountable to the docking unit. The benefit of this embodiment is that the user can easily and quickly detach/reattach the conveyor module, for example for the everyday cleaning. The conveyor module will on a daily basis be handled by store personnel in connection with cleaning of the reverse vending machine. The mountability must therefore be intuitive and the conveyor module must be easy to clean, remove and replace. A key to achieve this is to allow the conveyor module to be removed/un-docked without the need to unscrew or remove any electrical or mechanical connections. In case of unsuccessful docking of the conveyor module, it is obvious to the store personnel and optionally automatically detected by the machine.

According to a further embodiment of the invention, the conveyor module further comprises docking engagement means being adapted for engaging the conveyor module with the docking unit during mounting the conveyor module into the docking unit and being adapted for abutment of the conveyor module in a substantially longitudinal direction of the conveyor module during mounting, wherein the housing has a docking area which is adapted for being placed, in particular directly placed (direct contact), on the docking unit, and wherein the housing is adapted to laterally center the conveyor module when mounted. In this embodiment, the docking engagement means are in particular a docking projection and a surface from which the docking projection is projecting from. This embodiment provides a conveyor module which housing is structured such that it allows easy docking while the conveyor module is automatically positioned during inserting. Corresponding/mating surfaces on the housing of the docking unit and the housing of the conveyor module are chosen in order to guide and firmly dock the conveyor module in its correct position to ensure both wireless transfer of signals/energy and torque.

According to a further embodiment of the invention, the conveyor module is designed such that the housing is adapted for stopping a detach movement of the conveyor module substantially along its longitudinal direction by means of engaging with the docking unit. This has the benefit that the conveyor module is automatically locked in the docking unit against being pulled out straight, but the conveyor module has to be lifted up at its end distal to the docking engagement means before it can be pulled out.

According to a further embodiment of the invention, the conveyor module is provided with two conveyor belts, in particular with two conveyor belts in total.

According to a further embodiment of the invention, the conveyor module is constructed such that the two conveyor belts are arranged in order to form a V-shape in a cross section perpendicular to the conveying direction. This way the conveyed used beverage containers are securely kept on the conveyor belts when moved.

According to a further embodiment of the invention, the conveyor module is constructed such that it further comprises a first and a second drive drum each supporting one of the two conveyor belts, wherein the force receiving element is directly connected with and directly driving the first drive drum, and a force transmission element which is directly connected with the second drive drum, wherein the force receiving element is directly driving the force transmission element.

According to a yet further embodiment of the invention, the conveyor module is adapted to receive electrical power and to receive/send electrical signals wireless, in particular exclusively wireless. This enables a very smooth and easy mounting/detachment, because no electrical connections have to be established.

According to a further embodiment of the invention, the conveyor module further comprises biasing means for biasing a drum supporting the at least one conveyor belt, in order to keep the conveyor belt tensioned. This improves the guiding behavior of the conveyor belts.

According to a further embodiment of the invention, the conveyor module is constructed such that the force receiving element and the force transmission element is a sprocket, respectively.

According to a yet further embodiment of the invention, the conveyor module is designed such that only a single force receiving element is provided which is accessible from outside of the conveyor module. This means, all the mechanical energy for driving all the conveyor belts is introduced from externally via a single transmission element which is accessible from outside. This way only this single mechanical connection has to be established when docking, leading to a better fitting of the docked elements.

According to a further embodiment of the invention, the conveyor module is designed such that electrical power is transmitted inductively, and electrical signals are transmitted by radio signals.

According to a yet further embodiment of the invention, the conveyor module is designed such that the docking engagement means comprises a docking projection.

According to a yet further embodiment of the invention, the conveyor module further comprises a magnet for holding the conveyor module in its mounted position.

According to a further embodiment of the invention, the conveyor module is designed such that the conveyor module only comprises the two conveyor belts for moving objects conveyed by them. This has the benefit of a much more simplified construction of the conveyor module. Infeed units of reverse vending machines of the state of the art usually require additional driven wheels or rollers arranged in between the conveyor belts for rotating the used beverage containers about their longitudinal axes, in order to position a bar code of the container in the visual area of a scanner. As the conveyor module according to this embodiment is in particular used in connection with a plurality of scanners being arranged around the conveying path, the conveyor module can be designed lighter and with less driven elements.

According to a further embodiment of the invention, the conveyor module has electrical contacts provided at the housing. The contacts are provided for receiving electrical power and/or for sending/receiving electrical signals. The electrical contacts for electrical power and electrical signals are either the same contacts having both functions, or there are provided separate contacts for power and signals.

A further embodiment of the invention provides a docking unit for a conveyor module of a reverse vending machine, the docking unit comprising a housing, and a force feed element for outputting a driving power to the conveyor module, which force feed element is accessible from outside of the docking unit through an opening in the housing. This way a drive train for driving the conveyor belt is separated into a driving part (in the docking unit) and a driven part (in the conveyor module). Therefore, the conveyor module is lighter and no electrical power for the motor has to be transferred to the conveyor module. It allows the conveyor module to be structured simpler. Thus, a frequent or every day detachment of the conveyor module, e.g. for cleaning, is improved. It also makes the conveyor module cheaper in case it has to be replaced.

According to a further embodiment of the invention, the docking unit is adapted for detachably holding the conveyor module. This embodiment provides the same advantages as described already above in connection with the conveyor module.

According to a further embodiment of the invention, the docking unit is constructed such that it further comprises a motor for driving the force feed element. The motor is in particular an electrical step motor, but could also be a DC motor.

According to a further embodiment of the invention, the docking unit further comprises docking engagement means being adapted for supporting the conveyor module during mounting the conveyor module into the docking unit and being adapted for abutment of the conveyor module during mounting, wherein the housing has a receiving surface at least part of which is adapted to support, in particular directly support (direct contact), the conveyor module when mounted. This embodiment provides the benefits as already mentioned above in connection with the conveyor module.

According to a further embodiment of the invention, the housing is adapted for stopping a detach movement of the conveyor module along its longitudinal direction by means of engaging with the conveyor module. This has the benefit that the conveyor module is automatically locked in the docking unit against being pulled out straight, but the conveyor module has to be lifted up at its end distal to the docking engagement means before it can be pulled out.

According to a further embodiment of the invention, the docking unit further comprises at least one guiding surface for laterally guiding the conveyor module during mounting into the docking unit. This enables an intuitive and easy to realize position during docking.

According to a further embodiment of the invention, the docking unit further comprises a magnet for holding the conveyor module to the docking unit. The magnet is preferably a permanent magnet which attracts a corresponding permanent magnet or metallic part of the conveyor module.

According to a further embodiment of the invention, the docking unit is adapted to send electrical power and to receive/send electrical signals wireless, in particular exclusively wireless.

According to a further embodiment of the invention, the docking unit further comprising detection means for measuring a motor load and for asserting a pre-warning cleaning message based on the motor load. In particular, the motor is a step motor, and the detection means are adapted for measuring a counter-electromotive force in the step motor and for asserting the pre-warning cleaning message based on the counter-electromotive force. This improves the reliability and serviceability of the reverse vending machine.

According to a further embodiment of the invention, the docking unit further comprises a weigh cell for determining a weight of the conveyor module. This enables to determine the weight of the used beverage containers which are placed on the conveyor belts, which in turns improves detection precision of the reverse vending machine.

According to a further embodiment of the invention, the conveyor module is designed such that electrical power is transmitted inductively, and electrical signals are transmitted by radio signals.

According to a further embodiment of the invention, the docking unit is constructed such that only a single force feed element is provided which is accessible from outside the docking unit.

According to a further embodiment of the invention, the docking unit is constructed such that the force feed element is a sprocket.

According to a further embodiment of the invention, the docking unit has electrical contacts provided at the housing. The contacts are provided for outputting electrical power and/or for sending/receiving electrical signals. The electrical contacts for electrical power and electrical signals are either the same contacts having both functions, or there are provided separate contacts for power and signals.

According to a yet further embodiment of the invention, a conveyor module docking system for a reverse vending machine is provided, comprising a conveyor module and a docking unit.

According to a yet further embodiment of the invention, a reverse vending machine comprising a conveyor module docking system is provided.

These and other embodiments are described in the following in more detail with reference to the Figures.

DETAILED DESCRIPTION OF EXEMPLARY
EMBODIMENTS OF THE INVENTION

Figure 1:
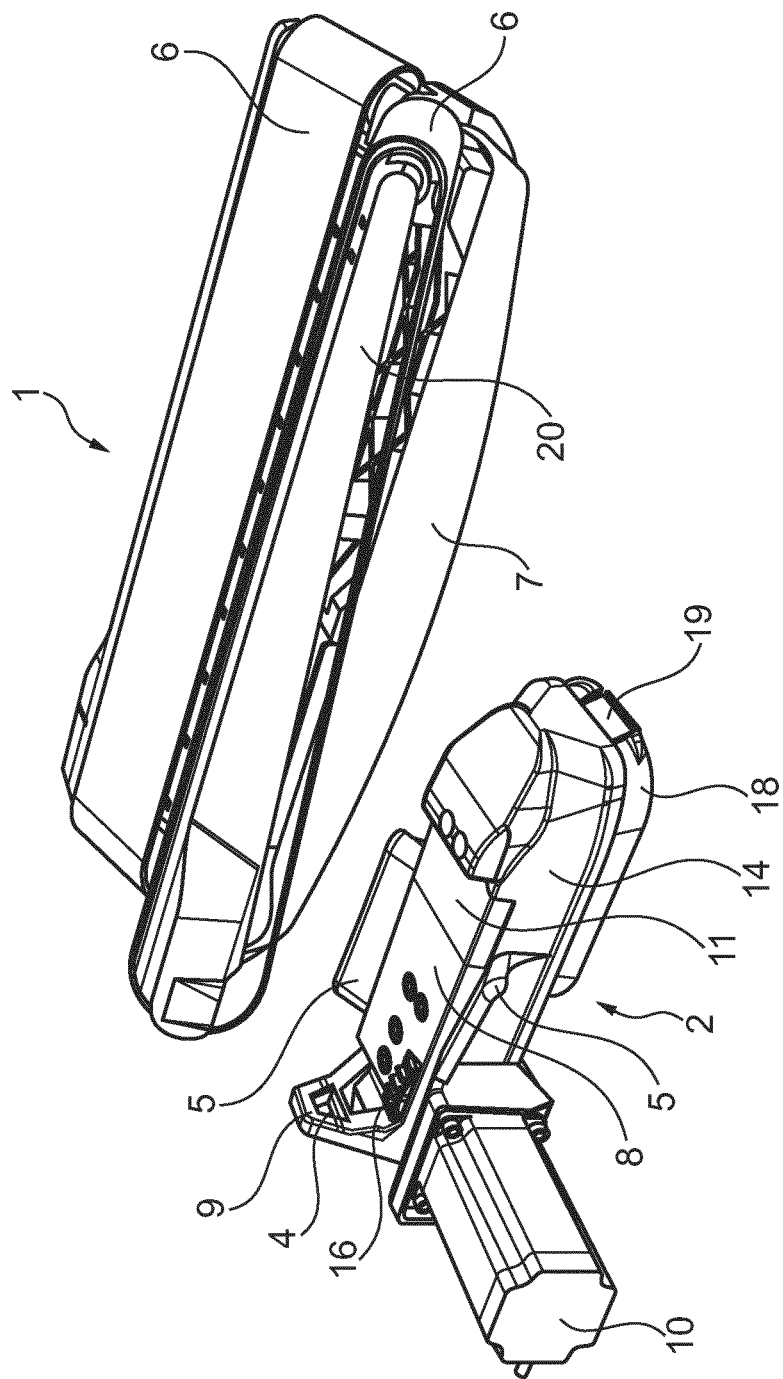
FIG. 1 is a perspective view of a conveyor module docking system including a conveyor module detached from a docking unit according to an exemplary embodiment of the invention.
Figure 2:
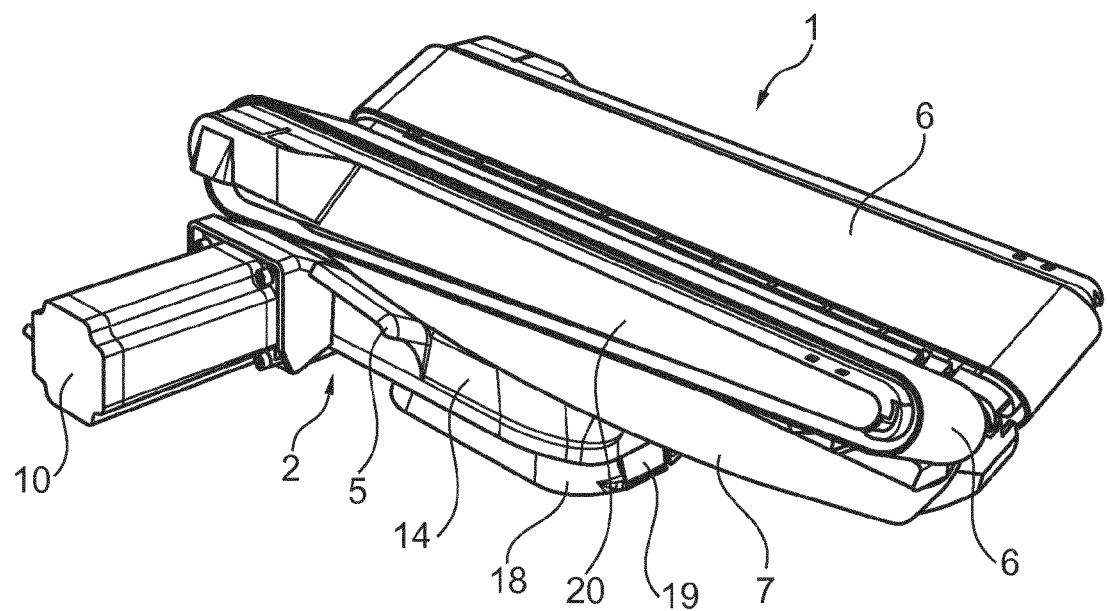
FIG. 2 is a perspective view of the conveyor module docking system of FIG. 1, wherein the conveyor module is detachably mounted to the docking unit.

FIGS. 1 and 2 illustrate a conveyor module docking system which includes a conveyor module 1 and a docking unit 2 according to an exemplary embodiment of the invention. The conveyor module 1 is used for a reverse vending machine (not illustrated) in order to convey used beverage containers (not illustrated), such as plastic bottles, glass bottles or cans, in and/or out of the reverse vending machine. In particular, the conveyor module docking system provides the functionalities of conveying used beverage containers into the reverse vending machine, stopping and presenting rejected used beverage containers back to the consumer, providing a metal value measurement of the conveyed containers, providing an used beverage container weight scale measurement, sequencing the used beverage containers prior to entering subsequent processing equipment and asserting a cleaning pre-warning message when the conveyor module 1 should be cleaned. The docking unit 2 is intended to be attached to a lower part of an opening in the reverse vending machine, and the conveyor unit 1 is intended to be detachably mounted to the docking unit 2 such that the conveyor module 1 is positioned within the opening of the reverse vending machine.

Figure 3:
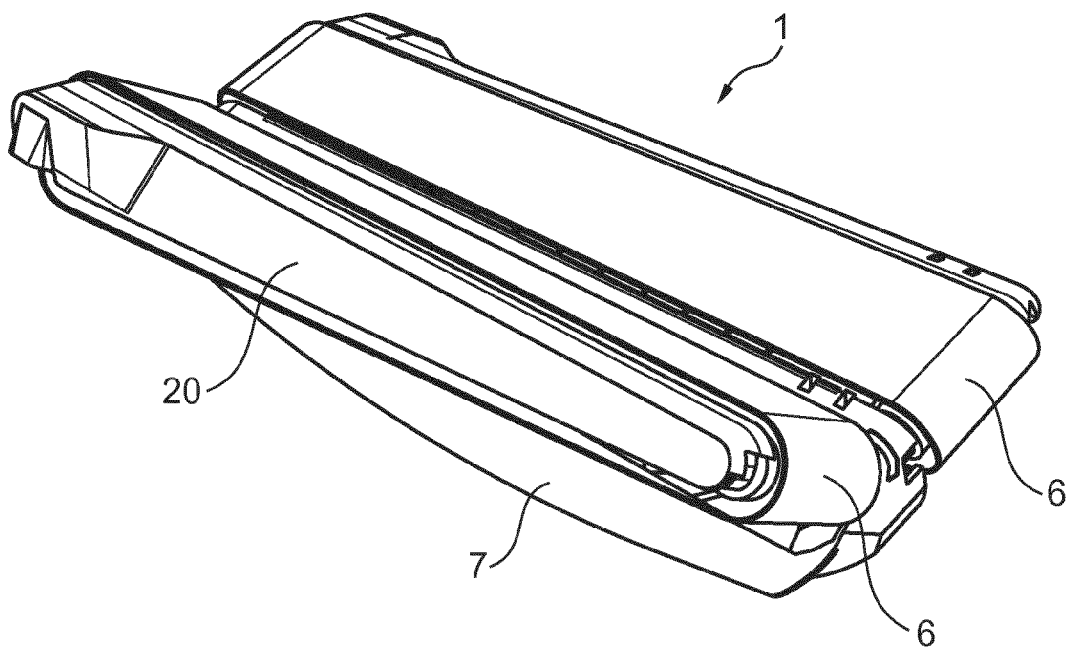
FIG. 3 illustrates the conveyor module in a perspective view from a slightly different angle compared to FIGS. 1 and 2.
Figure 4:
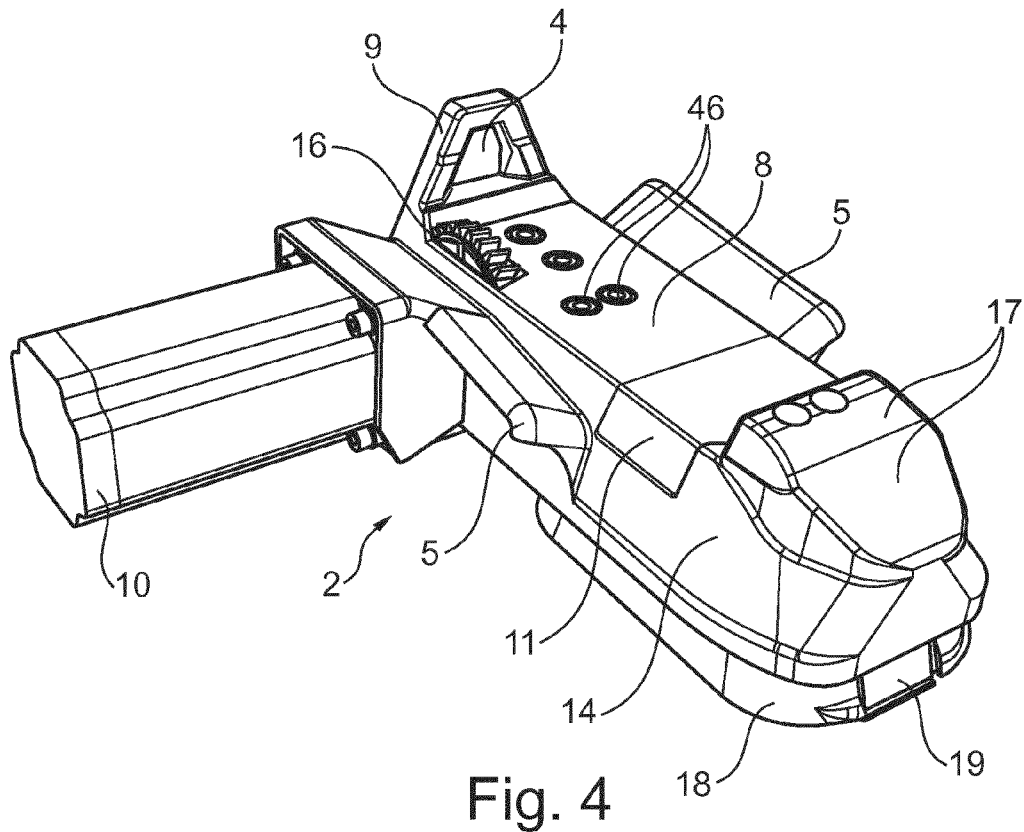
FIG. 4 is a more detailed perspective view of the docking unit of FIGS. 1 and 2.
Figure 5:
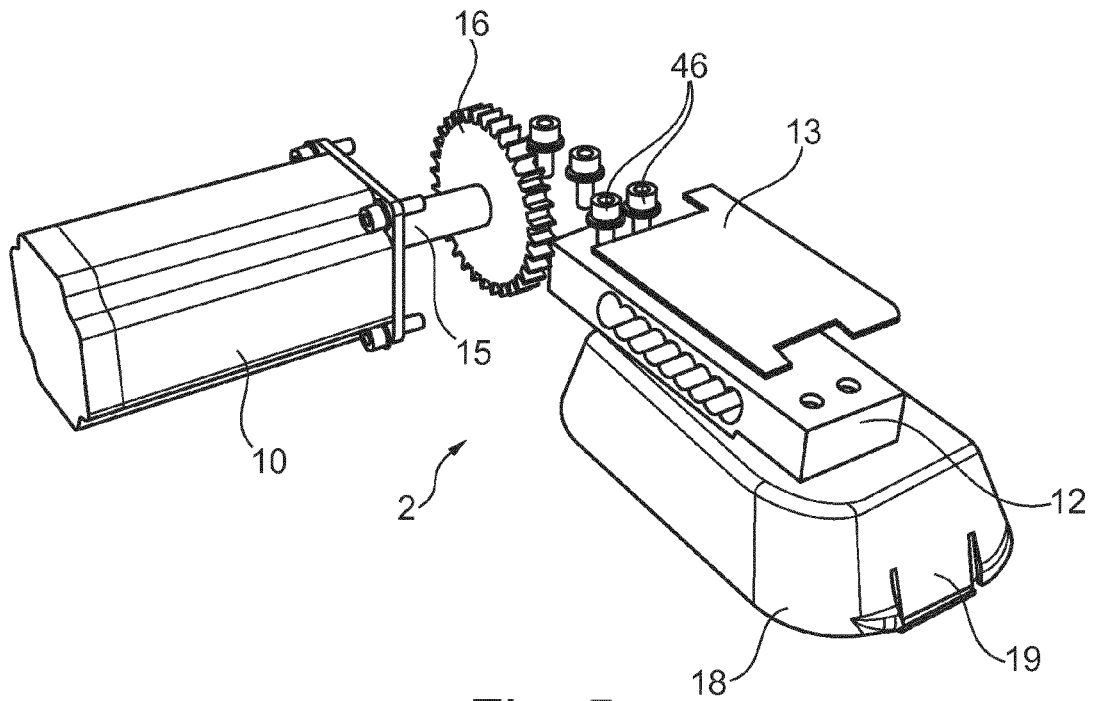
FIG. 5 illustrates internal parts of the docking unit of FIG. 4.

In FIG. 1, the conveyor module 1 is detached from the docking unit 2, and in FIG. 2 they are attached to each other. FIG. 3 illustrates the conveyor module 1 from a different angle compared to FIGS. 1 and 2. The conveyor module 1 is detachably mountable to the docking unit 2. In this embodiment, the detachable mountability is realized by a docking projection 3 (see FIG. 9 or 11) of the conveyor module 1 which is adapted to be inserted into a receptacle 4 (see FIG. 1 or 4) of the docking module 2. Additionally, the conveyor module 1 and the docking module 2 may be provided with a magnet, respectively, such that the attracting magnetic force between these two magnets is holding the conveyor module 1 to the docking unit 2. The magnets have to be chosen such as to enable a detachment of the conveyor module 1 without requiring excessive force of the user, and to securely hold the conveyor module 1 to the docking unit 2. Alternatively to two magnets, there could also be provided one permanent magnet at the conveyor module or docking unit which attracts a metallic part of the other part out of the conveyor module and docking unit. However, the usage of magnets is optional only, and the invention can be realized without this magnetic connection force. Naturally, the conveyor module 1 is also held by gravity force on its docking unit 2 arranged underneath. In order to ensure an easy-to-use positioning during mounting, the docking unit 2 is provided with guiding surfaces 5 which are positioned in a V-shape in a cross-section perpendicular to a longitudinal direction of the docking unit 2, such that the guiding surfaces 5 guide, center and position the conveyor module 1 with respect to the docking unit 2. This way a more stable position is realized and an alignment of the later described electrical wireless elements and/or magnets is ensured. Once the conveyor module 1 is positioned in place, side walls of a housing 7 laterally hold and position the conveyor module. Alternatively or additionally, the detachable mountability could be realized by a snap connection or a connection which can be released by pushing a button at the conveyor module or the docking unit.

The conveyor module 1 comprises two conveyor belts 6 which are endless belts and arranged relative to each other such that they form a V-shape in a cross-section perpendicular to the conveying direction. The surfaces of the conveyor belt loops, which face away from the docking unit 2, basically form the upper surface of the conveyor module 1, and thus the conveyor belts 6 are freely accessible for placing used beverage containers thereon. In between the sides of the conveyor belt loops, which face towards the docking unit 2, a housing 7 of the conveyor module 1 is projecting towards the docking unit 2.

Additionally to FIGS. 1 and 2, the docking unit 2 is illustrated in FIGS. 4 to 7 in more detail. A housing 14 of the docking unit 2 has a basically cuboid base body, wherein the side of which facing towards the conveyor module 1 forms a basically rectangular receiving surface 8 which is lower in height than the portions of the housing 14 adjacent to the short sides of the receiving surface 8. From one end of the receiving surface 8 (e.g. a short side of it), a docking wall 9 of the docking unit 2 is projecting towards the conveyor module 1, which is tapering away from the docking unit 2, and which docking wall 9 comprises the receptacle 4 in form of a through hole extending in parallel to a longitudinal direction of the docking unit 2 (wherein the longitudinal direction corresponds to the longer centerline of the cuboid base body). From the sides of the base body, which are perpendicular to the receiving surface 8, the two guiding surfaces 5 are projecting away from the base body such that they form a V-shape in a cross-section perpendicular to the longitudinal direction. Moreover, the guiding surfaces 5 are attached to the base body such that the end of each guiding surface 5 which is facing towards the docking wall 9 is arranged closer to the receiving surface 8 than the end opposite thereto. From the end of the receiving surface 8, which is distal to the docking wall 9, the housing 14 of the docking unit 2 is projecting towards the conveyor module in form of a wedge shape the height of which reduces in a direction away from the docking wall 9 (e.g. starting from a height having an extent of 20 to 50% of the docking wall 9). At the inside of this wedge shape, at the positions indicated with reference numeral 17, one or more magnets (not illustrated) may be provided, which interact with a magnet of the conveyor module 1 such that the magnets are attracted by each other with a magnetic force and may additionally hold the conveyor module 1 to the docking unit 2. On a side of the base body, an encased motor 10, in particular a step motor or alternatively a DC motor, for driving the conveyor belts 6, is attached to the housing 14 of the docking unit 2 by screws. A portion of the receiving surface 8, which is distal to the docking wall 9 is formed by a cover 11 which is in particular a thermoplastic cover. The remaining parts of the housing 14, such as the base body, the guiding surfaces, and the docking wall are made of aluminum. The cover 11 is provided for shielding purposes in order to cover a cutout in the aluminum housing. The aluminum housing provides a rectangular cutout underneath the cover 11, in order not to shield wireless signals. In case the housing 14 of the docking unit 2 is made of thermoplastic material, which would also be possible, then there would no cutout be necessary and also the cover 11 would be omitted. Underneath the receiving surface 8 (with respect to gravity force), a weigh cell 12 is provided. This way, when substracting a pre-determined weight force of the conveyor module 1, the weight of the container being placed on the conveyor module 1 can be calculated by the weigh cell 12 or an infeed control 13. The weight force of the conveyor module 1 could be pre-determined manually and electronically saved in the infeed control 13, or it could be determined by means of the weigh cell 12 as long as no container is placed on the conveyor belts 6, e.g. during an initialization phase. The infeed control 13 includes a wireless transfer functionally, is electrically connected with the motor 10 for handling the motor control, and includes electrical interfaces. The infeed control 13 is for example arranged in between the receiving surface 8 and the weigh cell 12. An end of a drive shaft 15 which is driven by the motor 10, is provided with a force feed element which is in particular a sprocket 16, but could also be a worm gear. The sprocket 16 has a conical shape which means that the toothed circumferential surface is tapered in a direction away from the motor 10. The sprocket 16 is projecting partially through an opening in the receiving surface 8 (in particular less than 30% of the sprocket diameter is exposed on the receiving surface 8). On the side of the base body which is opposite to the receiving surface 8 a base plate 18 is provided, which covers approximately half of this side of the base body and establishes the connection of the docking unit 2 to the reverse vending machine. Base plate 18 can be made of thermoplastic material or aluminum.

Figure 6:
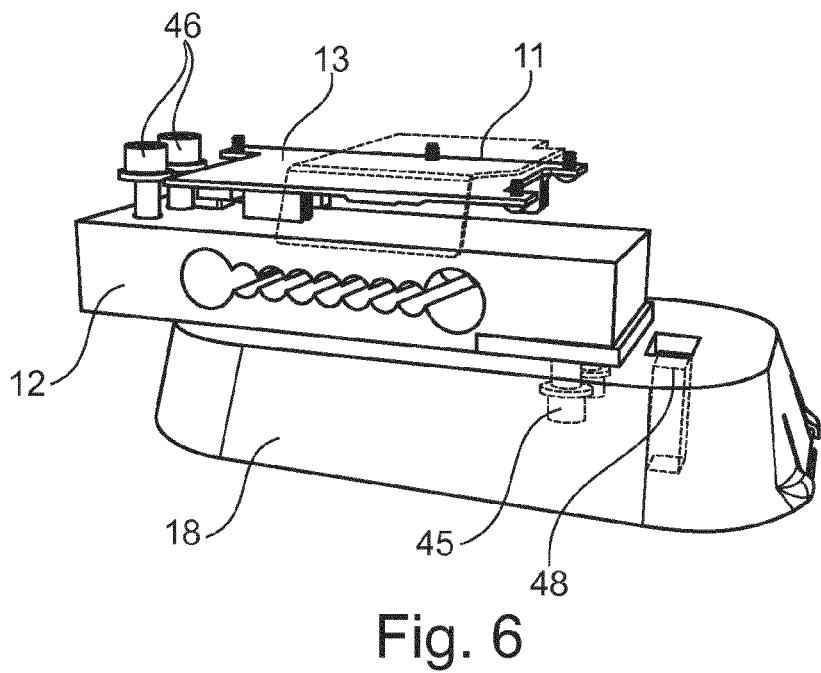
FIG. 6 illustrates internal parts, in particular a weigh cell, of the docking unit of FIG. 4.

FIG. 6 illustrates the integration of the weigh cell 12 in more detail. The end of the weigh cell 12, which is distal to the docking wall 9, is attached by means of screws 45 to the base plate 18. The screws 45 extent in particular in an upwards direction and force the weigh cell 12 onto the base plate 18. The opposite end of the weigh cell 12, which is proximal to the docking wall 9, is attached by screws 46 to the housing 14 of the docking unit 2, in particular to the receiving surface 8. The screws 46 extend in particular in a downwards direction and force the weigh cell 12 up to the inside of the receiving surface 8. When the conveyer module 1 is placed on the receiving surface 8, the weight force causes the weigh cell 12 to be bent a certain small degree, in particular the end of the weigh cell attached by screws 46 is bend downwards. This way, the weigh cell 12 can determine the weight of the conveyor module 1.

Figure 7:
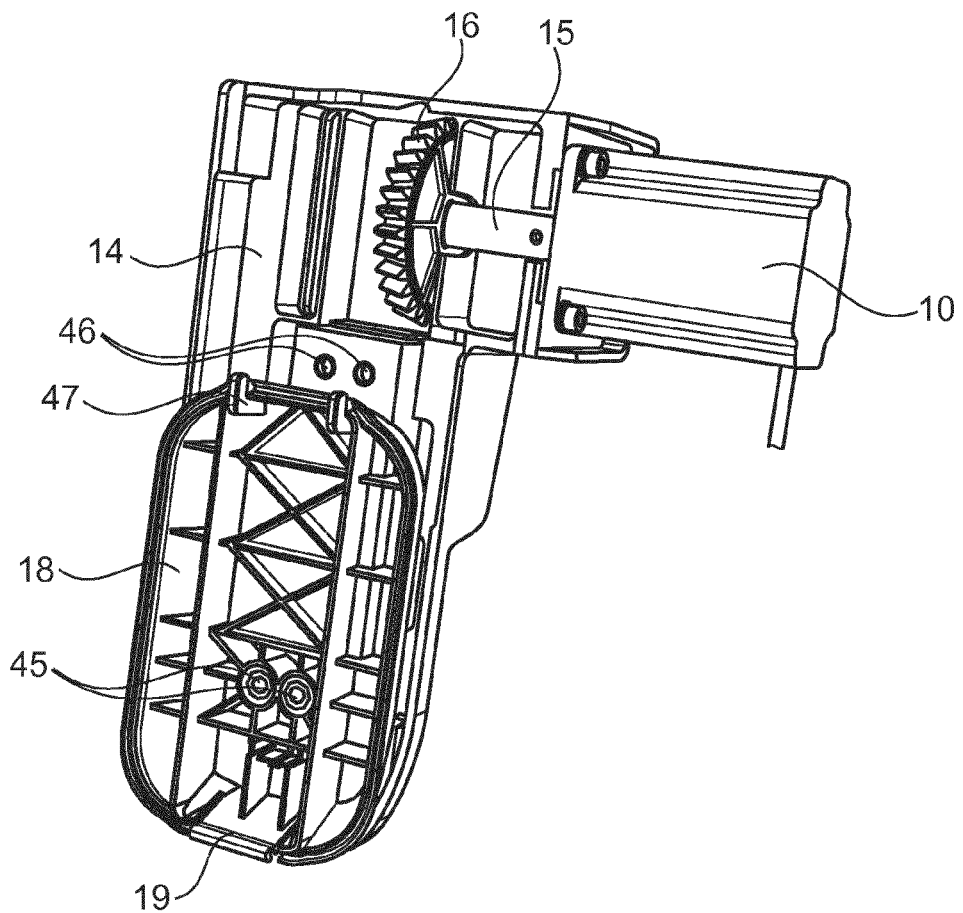
FIG. 7 illustrates the docking unit of FIG. 4 in a perspective view from below.

FIG. 7 illustrates the docking unit 2 from below. As can be seen, the base plate 18 is attached to the reverse vending machine by hooks 47 and a release button 19 which is in the form of a flap and also comprises a hook at its lower outer side. Thus, the base plate 18 can be hooked into respective recesses provided in the reverse vending machine, and can be released by pressing the release button 19 in order to unlock the hook of the release button 19 from its recess. Alternatively, instead of the hooks 47 and the release button 19, other release or fastening means could be provided, e.g. screws, for attaching the base plate 18 to the reverse vending machine. The housing 14 is attached to the base plate 18 by means of a snap-on connection, wherein a hook provided at the housing 14 is hooked into a recess 48 provided on the upper side of the base plate. Also here, the housing 14 can easily be detached from the base plate 18 by unhooking this connection.

Figure 8:
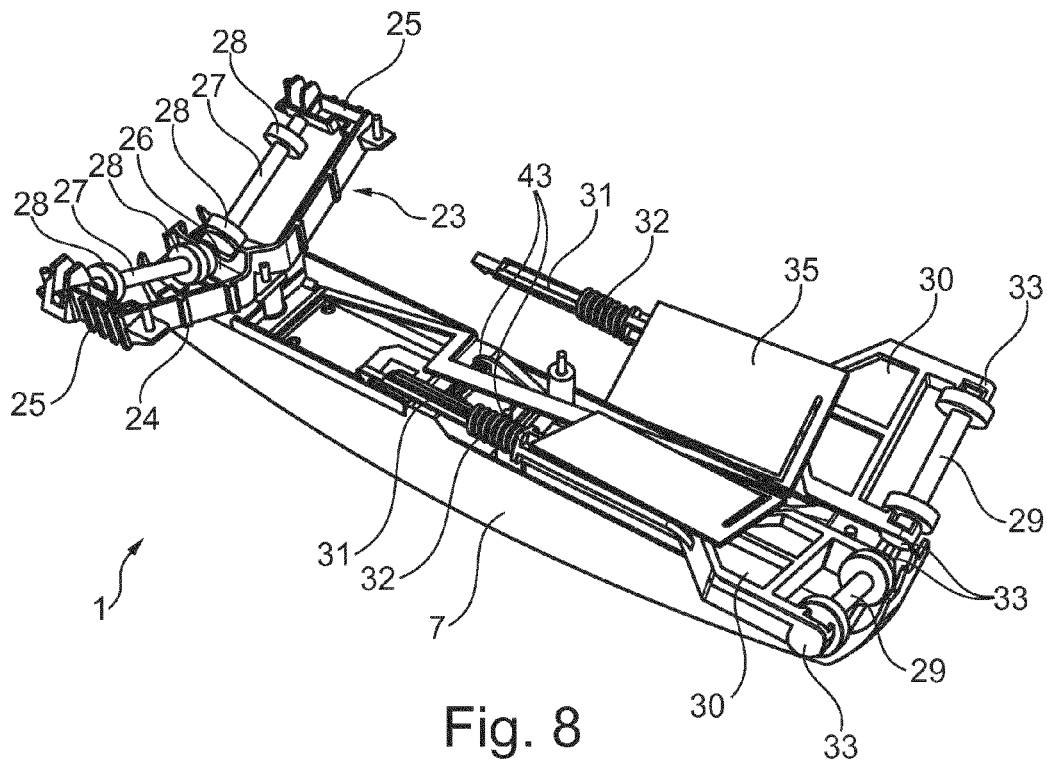
FIG. 8 is a perspective view from above, which shows internal parts of the conveyor module of FIGS. 1 to 3.
Figure 9:
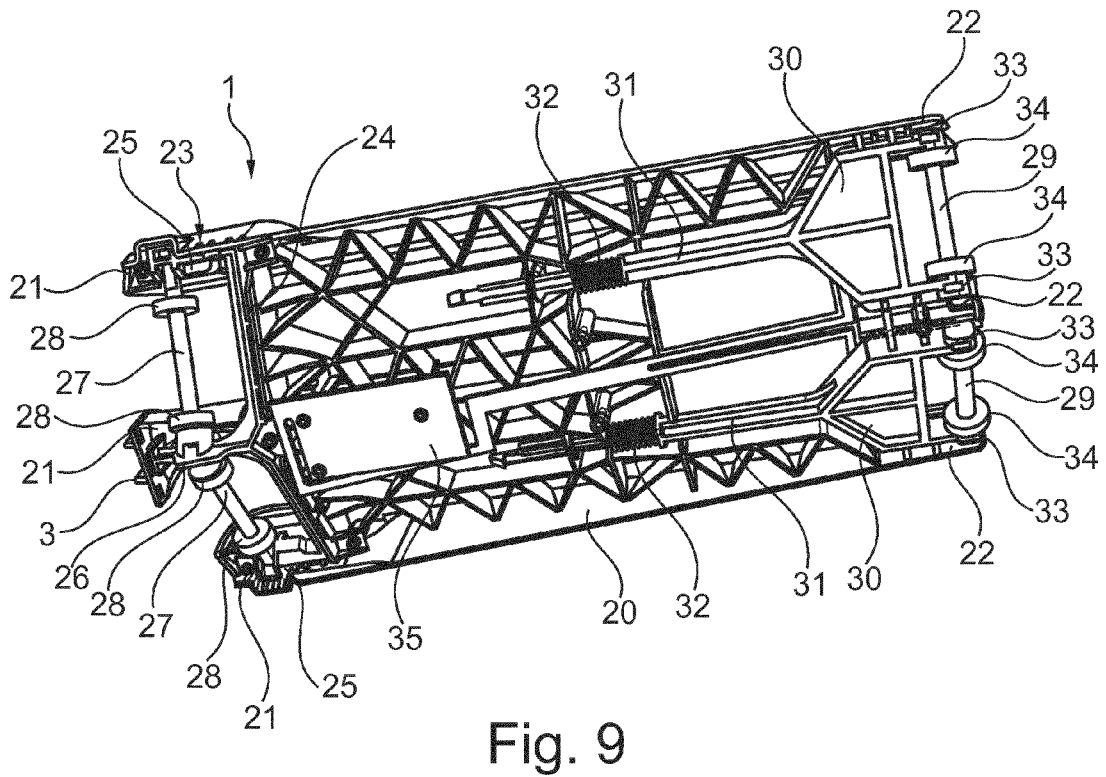
FIG. 9 is a perspective view from below, which shows internal parts of the conveyor module of FIGS. 1 to 3.

In the following, the conveyor module 1 is described in more detail with reference to the FIGS. 8 to 11, in which FIG. 8 illustrates internal parts of the conveyor module 1 from above, and FIG. 9 shows internal parts of the conveyor module 1 from below. FIG. 11 shows the conveyor module 1 from below with a housing encasing the internal parts and the conveyor belts 6 mounted. In the core of the conveyor module 1, a rib body 20 is provided, which is for example made of thermoplastic material. The rib body 20 has the shape of a rectangular frame with rips filling the inside of the frame. In a cross-section perpendicular to the longitudinal direction of the conveyor module 1, the rib body 20 forms a V-shape, in particular over its entire length. At one longitudinal end, three support arms 21 are projecting in the longitudinal direction of the conveyor module 1, in particular from the sides and the center of this end. From the middle one of these support arms 21, the docking projection 3 is projecting from an end surface of the support arm 21. This end surface is acting as a stopper when the docking projection 3 is inserted into the receptacle 4. These elements have several functions. When the conveyor module 1 is to be mounted to the docking unit 2, the docking projection 3 is inserted into the receptacle 4, and the docking projection 3 and the receptacle 4 are both guiding the conveyor module 1 during inserting along a substantially longitudinal direction. Due to abutment of the end surface, which forms the foot of the docking projection 3 (and the end of the support arm 21), at the docking wall 9, the inserting movement is stopped while the docking projection 3 and the receptacle 4 still allow downward rotation of the conveyor module 1 for its placement onto the docking unit 2. Thus, the docking projection 3, the end surface forming its foot, the receptacle 4 and the docking wall 9 all form docking engagement means. Alternatively to these described docking engagement means, others could be provided which do not engage at a longitudinal end of the conveyor module 1, but at a position in between the conveyor module 1 and the docking unit 2. Also, the conveyor module 1 could be provided with a receptacle and the docking unit 2 could be provided with a docking projection. At the end of the rib body 20, opposite to the docking projection 3, three arms 22 are projecting in the opposite direction of the support arms 21. In particular, the arms 22 are extending from the sides and the center of this end. The support arms 21 are supporting a drive drum base 23 having a cross-beam 24 and three longitudinal beams 25, 26. The cross-beam 24 is attached to the shorter side of the frame of the rib body 20, and the longitudinal beams 25, 26 are attached to the three support arms 21 by screws, respectively. Thus, the drive drum base 23 has a shape corresponding to the three support arms 21 and the side of the rib body 20 from which the three support arms 21 are extending. Correspondingly, the cross-beam 24 forms a V-shape in a plane perpendicular to the longitudinal direction of the conveyor module 1. In between the two outer ones of the longitudinal beams 25 and the central longitudinal beam 26, a drum shaft 27 is held by the longitudinal beams 25, 26. These drum shafts 27 are fixedly arranged (stationary) with respect to the rib body 20. Ball bearings 28 are arranged on each drum shaft 27 in order to rotatably support the later described belt drums. In particular, each drum shaft 27 is provided with two ball bearings 28. At the opposite end of the rib body 20, another two drum shafts 29 are provided. However, these drum shafts 29 are not fixedly arranged (stationary) with respect to the rib body 20, but each drum shaft 29 is supported by a biasing fork 30 which is supported by the rib body 20 such that it is translatory movable in a longitudinal direction, in order to keep the conveyor belts 6 tensioned. The biasing forks 30 have a longitudinal shaft 31 which is extending through one of the rips of the rib body 20, respectively, and is thus supported and guided by this rib. The diameter of the longitudinal shaft 31 increases at about the middle of the shaft 31 in order to form a stopper for a spring 32 (in particular a cylindrical spring) which is arranged around the shaft 31 on the side of the stopper which is distal to the drum shafts 29. The other end of the spring 32 is in abutment with the rib that is supporting the longitudinal shaft 31 or with another one of the rips of the rib body 20. This way, the spring 32 is urging the biasing fork 30 in a direction towards the drum shaft 29, whereas the tension of the conveyor belts 6 is urging in the opposite direction, namely in a direction to compress the spring 32. The conveyor belts 6 are shorter than the longest expanded length of the spring 32. Thus, by choosing the spring constant of the spring 29, the degree of tension of the conveyor belts 6 can be adjusted, and the conveyor belts 6 can be tensioned individually. From the end of the shaft 31, a plate body and from this one, two fork arms 33 are projecting in a direction away from the shaft 31. Each fork arm 33 is provided with a guiding rail extending in a longitudinal direction of the biasing fork 30. The arms 22 of the rib body 20 are provided with respective grooves, such that the guiding rails of the fork arms 33 are supported by these grooves keeping the biasing forks 30 translatory movable. Each biasing fork 30 is supporting one of the drum shafts 29 in between its fork arms 33. Thus, the biasing forks 30 and the respective springs 32 form biasing means, respectively. Each drum shaft 29 is provided with ball bearings 34, in particular two ball bearings per shaft. However, instead of the ball bearing, roller bearings could be provided, or the drum shafts 27, 29 could be supported such that the drum shafts are rotatable held by the drive drum base 23/the biasing fork 30, or the invention could be implemented without bearings wherein the drum shafts 27, 29 directly support belt drums. Above, biasing means are described to be in the form of the biasing fork 30 with the respective spring 32, however, the biasing means could also be in another form, e.g. the drum shafts 29 are biased at each end by an individual spring, or the biasing means could comprise a flat spring, and/or the spring could be arranged such as to bias the drum shafts 29 by pulling instead of pushing. Almost unnecessary to mention that the biasing means could comprise, instead of the fork shaped support member, a differently shaped support member, such as a plate shaped support member. The invention could also be beneficially be utilized by tensioning the conveyor belts 6 manually, e.g. by providing the biasing fork 30 with a threaded shaft and a nut instead of the spring 32, or with a thread/nut mechanism which is supporting each end of the drum shafts 29, such as to tension the conveyor belts 6 manually when mounting them. Reference numeral 35 indicates a wireless metal sensor which is formed of a printed circuit board which is cut such that three connected parts are created. This printed circuit board is then bent into position when mounted. This saves money in being fewer parts and is thus more reliable. Two of the parts are arranged in between the upper side of the conveyor belt (the belt portion which is adapted for carrying the used beverage containers to be conveyed) and the biasing forks 30. The third part is attached to the rib body 20 at a position which is vertically above the infeed control 13 of the docking unit 2 when the conveyor module 1 is attached to the docking unit 2, and both are communicating with each other. The three parts of the printed circuit board of the wireless metal sensor 35 are mechanically and electrically connected with each other via an arm-shaped part of the board which is guided around the respective three parts and connected with the sides of the three parts facing longitudinally away from the center of the rib body 20. One or more magnet (not illustrated) may be attached to the inside of the housing 7 at a position indicated with reference numeral 43, which is an inclined surface of a wedge shaped recess provided in the housing 7. This magnet would be aligned vertically with the magnet provided in the docking unit 2. The magnets are optional, and it would also be possible to hold the conveyor module 1 just by gravity force to the docking unit 2.

The wireless metal sensor 35 comprises electronics circuits, namely two metal sensor coils (one in each of the printed circuit boards at the biasing fork 30), an oscillator for metal sensor coils, a transformer coil and a power supply with rectifier. Together with the infeed control 13 of the docking unit 2, a wireless metal sensing can be realized, which may detect the presence or absence of metal on the conveyor belt 6 and/or the kind of metal which is present on the conveyor belt 6. The infeed control 13 of the docking unit 2 also comprises electronic circuits, namely a transformer coil, a class-E coil driver with sensor signal detector, a step motor driver with step loss detector, a weight scale amplifier, a microcontroller, and a power supply. The wireless transfer of electrical power from the infeed control 13 to the wireless metal sensor 35 is facilitated by ensuring that the transformer coils of both are reasonably aligned and in close proximity. The oscillator frequency on the wireless metal sensor 35 (which frequency constitutes the metal sensing signal) is transferred to the infeed control 13 over the same inductive wireless interface. This is achieved by loading the transformer coil on the wireless metal sensor 35 according to the oscillator frequency. Due to the inductive coupling, this frequency can be filtered out and presented to the microcontroller on the infeed control 13, hence metal in proximity to the sensing coil can be detected and classified. Whether the metal detection functionality is ready for operation can be determined by monitoring the frequency of the metal sensor signal. If this frequency is below a threshold, this is indicating that the conveyor module 1 in not in its correct position. Thus, in case of unsuccessful docking of the conveyor module 1, this is automatically detected by the infeed control 13.

Figure 10:
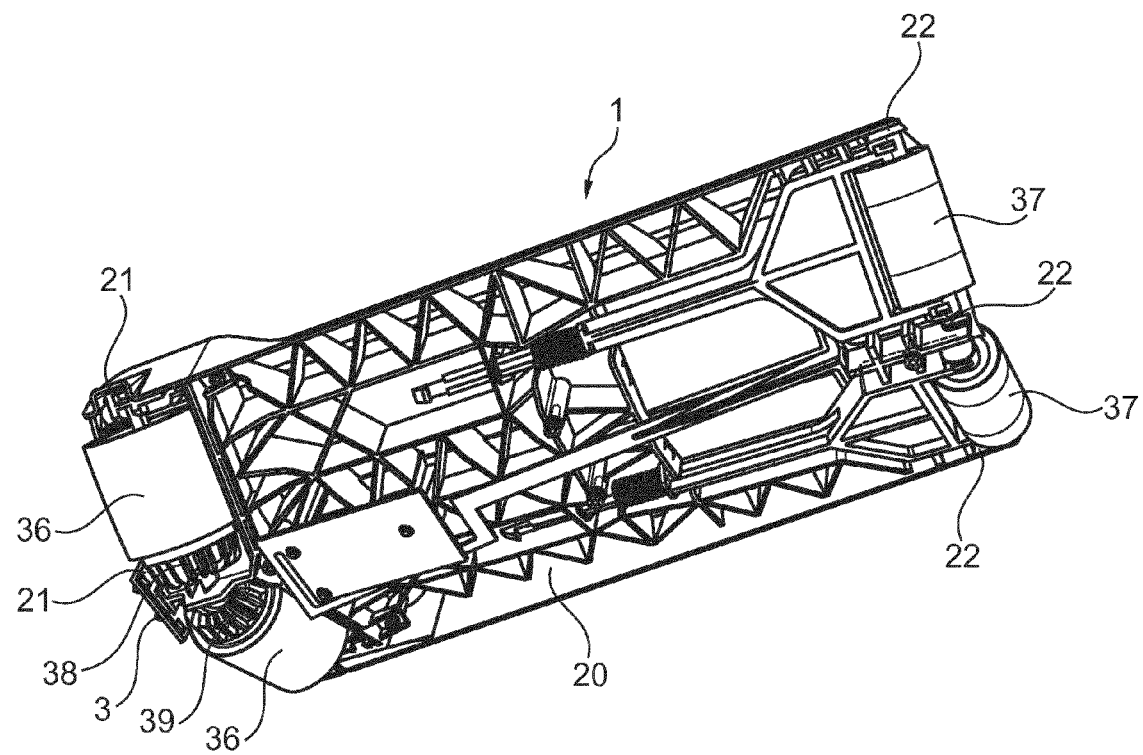
FIG. 10 is a perspective view of the conveyor module from below, in which compared to FIG. 9 belt drums are mounted.
Figure 11:
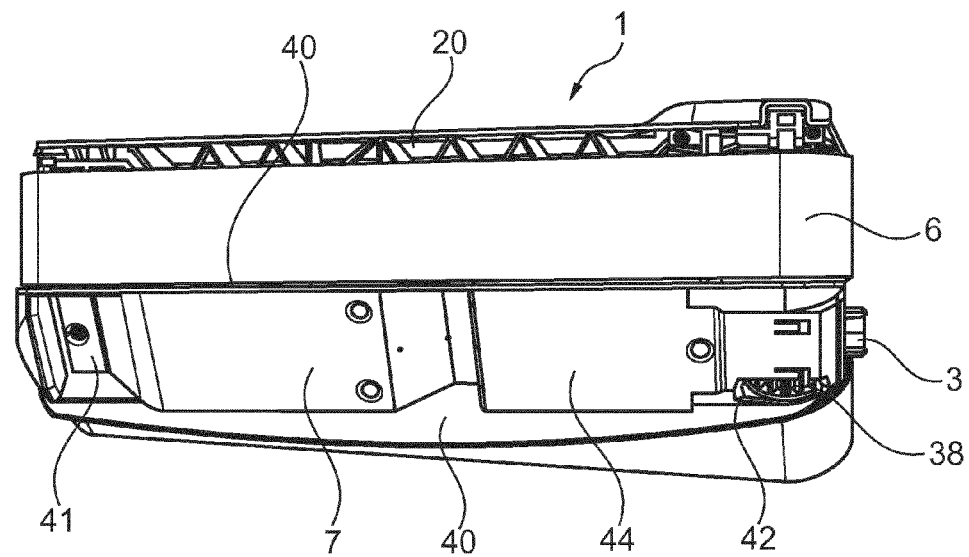
FIG. 11 is a perspective view of the conveyor module from below, in which a housing and conveyor belts are mounted.

FIG. 10 illustrates internal parts of the conveyor module 1 from below, from a slightly different angle as FIG. 9. In FIG. 10, the conveyor module 1 is illustrated with belt drums being mounted on the drum shafts 27, 29. Drive drums 36 which are mounted on the ball bearings 28 of the drum shafts 27, are larger in diameter than driven drums 37 which are mounted on the ball bearings 34 of the drum shafts 29. The drive drums 36 form the back of the conveyor module 1, and the driven drums 37 form the front of the conveyor module 1. The drive drums 36 and the driven drums 37 have a crowned shape. Thus, due to the combination of the crowned shape of the belt drums 36, 37 and the tensioned conveyor belts 6, the conveyor belts 6 are guided, i.e. kept centered on the belt drums 36, 37, especially when the conveyor belts 6 are new or highly contaminated. A heavy crowned shape also enables short assembly time and reduces the need for training of the assembly operator. Each drive drum 36 is provided on its inner side with a sprocket, wherein sprocket 38 is forming a force receiving element and wherein sprocket 39 is forming a force transmission element. The sprockets 38, 39 have a twin conic shape which means that a first portion, which is adjacent to the associated drive drum 36, is tapered in a direction away from the base drum 36 and continues into a portion which is tapered with a larger extent than the first tapering. The sprockets 38, 39 are connected torque proof with the associated drive drum 36, respectively. The force which is introduced by the sprocket 38 into the conveyor module 1 (introduced into the conveyor module 1 from external of the conveyor module 1) from the sprocket 16 of the docking unit 2, is driving the drive drum 36 to which it is directly connected to. Further, the sprocket 38 is driving the other drive drum 36 via sprocket 39. The transmission of the rotational force between sprocket 38 and sprocket 39 is realized by the sprockets 38, 39 engaging in a gear like manner on their upper sides. Due to the V-shaped arrangement of the drum shafts 27, the sprockets 38, 39 are distanced from each other on their lower sides, but engage with each other on their upper sides. Thus, a drive train of the conveyor module docking system comprising the conveyor module 1 and the docking unit 2, is (due to the docking function) divided into a driving part and a driven part. The driving part is basically formed by the step motor 10 with the sprocket 16 attached to its shaft 15. The motor 10 is attached to the housing 14 of the docking unit 2 by screws. The driven part is basically formed by the drive drums 36 with their sprockets 38, 39, which are attached to the drum shafts 27 via ball bearings 28.

At the side of the rib body 20, which is faced towards the docking unit 2, the housing 7 is provided, which is for example made of thermoplastic material. The housing 7 is projecting towards the docking unit 2, in between the conveyor belt 6. Further, the housing 7 has a longitudinal shape with a length substantially corresponding to the longitudinal extend of the conveyor belt loops and a width which is slightly larger than the width of the base body of the docking unit 2. The housing 7 comprises substantially rectangular surface which is attached to the rib body 20 by four illustrated screws. The portion of this rectangular surface which is in FIG. 11 to the right of the two center screws, conforms in its shape to the shape of the upper side of the housing 14 of the docking unit 2. Reference numeral 44 indicates a docking area which is adapted for being placed on the receiving surface 8. Further, at the end of the rectangular surface, which is distal to the docking projection 3, a hand grip 41 for holding the conveyor module 1 during mounting and detaching the conveyor module 1 is provided. Directly adjacent to the docking area 44 and distal to the docking projection 3, a substantially wedge shaped recess is provided which basically corresponds to the shape of the wedge shape at the upper side of the docking unit 2, thus the recess is reducing its depth with respect to the docking area 44 in a direction away from the docking projection 3. This way, when the conveyor module 1 is placed on the docking unit 2, the wedge-shaped projection of the housing 14 of the docking unit 2 is engaged with the wedge-shaped projection of the housing 7 of the conveyor unit 1, and acting as detach locking means which stop a movement of the conveyor module 1 away from the docking wall 9. In order to be able to detach the conveyor module 1 from the docking unit 2, the conveyor module 1 has to be lifted at its end distal to the docking projection 3 before the docking projection 3 can be drawn out of the receptacle 4. Due to the tapering of the wedge shape, the conveyor module 1 is guided beyond the wedge shaped projection, in case the conveyor module 1 is already lowered down to the docking unit 2, before the docking projection 3 is inserted all the way into the receptacle 4. Two housing walls 40 extend downwards such that they are in contact with and arranged on both sides of the base body of the docking unit 2. This way, the housing walls 40 act to laterally center the conveyor module 1 with respect to the docking unit 2. The housing walls 40 extend over the entire longitudinal length of the housing 7, wherein they arch downwards such that they reach furthest down in a middle part. Corresponding to the position of the sprocket 38, the housing 7 comprises an opening 42 through which the sprocket 38 is accessible by the sprocket 16 of the docking unit.

As dirt on the conveyor belts 6 may accumulate, a drive train braking torque resulting from friction may increase. When the difference between the normally larger driving torque and the braking torque decreases, the motor 10 may skip steps, hence the ability of the step motor 10 to drive the conveyor belts 6 may decrease. This situation is detected by the motor driver of the infeed control 13 and used to increase a motor current and assert a pre-warning cleaning message. In general terms, the pre-warning cleaning message is determined based on a motor load. The specific detection method may depend on the kind of motor which is used for the motor 10. In case of a DC motor, the motor load can be determined based on the current which is supplied to the DC motor. In case of a step motor, the detection is facilitated by measuring a counter-electromotive force in the step motor.

According to another exemplary embodiment of the invention, the conveyor module 1 can be provided with electrically conductive contacts at the wireless transfer area 44 and/or the docking projection 3 (or generally speaking at the docking engagement means) which are adapted to come in contact with electrically conductive contacts of the docking unit 2. At the docking unit 2, these contacts could be provided at the receiving surface 8 or the receptacle 4 (or generally speaking at the docking engagement means). This way additionally or alternatively to the previously described wireless transmission, electrical power or electrical signals could be transmitted between the conveyor module and the docking unit by means of these electrically conductive contacts.

According to another exemplary embodiment of the invention, it would also be possible to provide only a single conveyor belt 6 which defines a flat upper side (the side carrying the objects to be conveyed) wherein on both sides of which stationary guiding walls are provided for avoiding objects to fall of the conveyor belt. It would also be possible to provide this single conveyor belt such that its upper side defines a U-shape. This could for example be realized by providing two or three belt drums at each deflection end of the conveyor belt, which drums are inclined with respect to each other, such that their axes describe a V-shape (in case of two) or a U-shape (in case of three) in a cross-section perpendicular to the conveying direction.

According to another exemplary embodiment of the invention, it would also be possible to construct the support mechanism of the conveyor belts 6 differently. Instead of providing two drum shafts 27, 29 at each deflection end of the conveyor belts 6, there could also be provided only one drum shaft at each deflection end which is straight. In such an embodiment the drive belt drums could be torque proof connected with one of the drum shafts which, in turn, is driven, e.g. in its center portion.

According to another exemplary embodiment of the invention, it would also be possible to provide plural belt drums at each longitudinal end of the conveyor module which are torque proof supported by articulated drum shafts at each deflection end such that driving power is transmitted between the portions of a driving drum shaft by joints in between adjacent portions.

According to another exemplary embodiment of the invention, it would also be possible to construct the driving mechanism of the conveyor belts 6 differently. Instead of providing the sprockets the driving power could be transmitted by a pinion and chain mechanism, by a drive belt or by a cam belt.

According to another exemplary embodiment of the invention, it would also be possible to provide module belts or modular belts, in which a single or plural conveyor belts are provided together with respective belt drums and support mechanism as a module which can be incorporated into the conveyor module.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously.

Thus, the applicant explicitly reserves the right to claim one of the following aspects:

1. Conveyor module (1) for a reverse vending machine, wherein the conveyor module (1) is detachably mountable to a docking unit (2), in particular a docking unit according to one of aspects 13 to 19, the conveyor module comprising:
   at least one conveyor belt (6);
   docking engagement means (3) being adapted for engaging the conveyor module (1) with a docking unit (2) during mounting the conveyor module (1) into the docking unit (2) and being adapted for abutment of the conveyor module (1) in a substantially longitudinal direction of the conveyor module (1) during mounting, and
   a housing (7) having a docking area (44) which is adapted for being placed on the docking unit (2), and the housing (7) being adapted to laterally center the conveyor module (1) when mounted.

2. Conveyor module (1) according to aspect 1, wherein the housing (7) is adapted for hindering a detach movement of the conveyor module (1) substantially along its longitudinal direction by means of engaging with the docking unit (2).

3. Conveyor module (1) according to one of the preceding aspects, further comprising a force receiving element (38) for receiving a driving power for driving the at least one conveyor belt (6), which force receiving element is accessible from outside of the conveyor module (1) through an opening (42) in the housing (7).

4. Conveyor module (1) according to aspect 3, wherein only a single force receiving element (38) is provided which is accessible from outside of the conveyor module (1).

5. Conveyor module (1) according to one of the preceding aspects, wherein the conveyor module (1) is provided in total with two conveyor belts (6).

6. Conveyor module (1) according to aspect 5, wherein the conveyor module (1) only comprises the two conveyor belts (6) for moving objects conveyed by them.

7. Conveyor module (1) according to aspect 5 or 6, wherein the two conveyor belts (6) are arranged in order to form a V-shape in a cross section perpendicular to the conveying direction.

8. Conveyor module (1) according one of the preceding aspects, wherein the docking engagement means comprises a docking projection (3).

9. Conveyor module (1) according to one of the preceding aspects, further comprising a magnet for holding the conveyor module (1) in its mounted position.

10. Conveyor module (1) according to one of the preceding aspects, wherein the conveyor module (1) is adapted to receive electrical power and to receive/send electrical signals exclusively wireless.

11. Conveyor module (1) according to one of the preceding aspects, wherein the at least one conveyor belt (6) is supported by a drum (36, 37) at each deflection end of the conveyor belt (6), the drum (37) at one deflection end being biased by a biasing means, in order to keep the conveyor belt (6) tensioned.

12. Conveyor module (1) according to one of the preceding aspects, further comprising a hand grip (41) integrated into the housing (7) at a longitudinal end of the conveyor module (1).

13. Docking unit (2) for a conveyor module (1) of a reverse vending machine, in particular a conveyor module (1) according to one of aspects 1 to 12, the docking unit (2) being adapted for detachably holding the conveyor module (1); the docking unit (2) comprising:

docking engagement means (4) being adapted for supporting the conveyor module (1) during mounting the conveyor module (1) into the docking unit (2) and being adapted for abutment of the conveyor module (1) during mounting, and a housing (14) having a receiving surface (8) at least part of which being adapted to support the conveyor module (1) when mounted.

14. Docking unit (2) according to aspect 13, wherein the housing (14) is adapted for hindering a detach movement of the conveyor module (1) along its longitudinal direction by means of engaging with the conveyor module (1).

15. Docking unit (2) according to one of aspects 13 or 14, further comprising at least one guiding surface (5) for laterally guiding the conveyor module during mounting into the docking unit.

16. Docking unit (2) according to one of aspects 13 to 15, further comprising a motor (10) for driving a force feed element (16) which is adapted to introduce mechanical driving power into the conveyor module (1), in order to drive at least one conveyor belt (6) of the conveyor module (1).

17. Docking unit (2) according to aspect 16, further comprising detection means for measuring a motor load and for asserting a pre-warning cleaning message based on the motor load.

18. Docking unit (2) according to one of aspects 13 to 17, further comprising a magnet for holding the conveyor module (1) to the docking unit (2).

19. Docking unit (2) according to one of aspects 13 to 18, wherein the part of the receiving surface (8) which is supporting the conveyor module (1) is forwarding a weight force of the conveyor module (1) to a weigh cell (12).

20. Conveyor module docking system for a reverse vending machine, comprising a conveyor module (1) according to one of aspects 1 to 12, and a docking unit (2) according to one of aspects 13 to 19.

21. Reverse vending machine comprising a conveyor module docking system according to claim 20.

22. Conveyor module (1) for a reverse vending machine, wherein the conveyor module (1) is mountable to a docking unit (2), wherein the conveyor module (1) is adapted to receive electrical power and to receive/send electrical signals wireless, in particular exclusively wireless.

23. Conveyor module (1) according to aspect 22, wherein electrical power is transmitted inductively, and electrical signals are transmitted by radio signals.

24. Docking unit (2) for a conveyor module (1) of a reverse vending machine, wherein the docking unit (2) is adapted to send electrical power and to receive/send electrical signals wireless, in particular exclusively wireless.

25. Docking unit (2) according to aspect 24, wherein electrical power is transmitted inductively, and electrical signals are transmitted by radio signals.

The invention claimed is:

1. A conveyor module for a reverse vending machine, wherein the conveyor module is detachably mountable to a docking unit, the conveyor module comprising:
at least one conveyor belt;
a housing that supports the at least one conveyor belt; and
a force receiving element configured to receive a driving power for driving the at least one conveyor belt, and the force receiving element is accessible from outside of the conveyor module through an opening in the housing.

2. The conveyor module according to claim 1, wherein the conveyor module is configured to receive electrical power and to receive/send electrical signals wirelessly.

3. The conveyor module according to claim 1, further comprising biasing means for biasing a drum supporting the at least one conveyor belt, in order to keep the conveyor belt tensioned.

4. The conveyor module according to claim 1, wherein the docking unit comprises:
a housing; and
a force feed element for outputting the driving power to the force receiving element of the conveyor module, and the force feed element is accessible due to an opening in the housing.

5. A docking unit configured to detachably hold a conveyor module of a reverse vending machine, the docking unit comprising:
a housing; and
a force feed element for outputting a driving power to a force receiving element of the conveyor module, and the force feed element is accessible due to an opening in the housing.

6. The conveyor module according to claim 1, further comprising:
docking engagement means for engaging the conveyor module with the docking unit during mounting of the conveyor module into the docking unit and for abutment of the conveyor module in a substantially longitudinal direction of the conveyor module during mounting,
wherein the housing has a docking area which is configured to be placed on the docking unit, and wherein the housing is configured to laterally center the conveyor module when mounted.

7. The conveyor module according to claim 6, wherein the housing is configured to stop a detach movement of the conveyor module substantially along its longitudinal direction by means of engaging with the docking unit.

8. The conveyor module according to claim 1, wherein the at least one conveyor belt is two conveyor belts.

9. The conveyor module according to claim 8, wherein the two conveyor belts are arranged in order to form a V-shape in a cross section perpendicular to the conveying direction.

10. The conveyor module according to claim 8, further comprising:
a first and a second drive drum each supporting one of the two conveyor belts, wherein the force receiving element is directly connected with and directly driving the first drive drum, and
a force transmission element which is directly connected with the second drive drum, wherein the force receiving element is directly driving the force transmission element.

11. The docking unit according to claim 5, wherein the force feed element projects outside of the housing through the opening in the housing.

12. The docking unit according to claim 5, further comprising:
docking engagement means configured to support the conveyor module during mounting of the conveyor module into the docking unit and configured to abut the conveyor module during mounting, wherein the housing has a receiving surface at least part of which is configured to support the conveyor module when mounted.

13. The docking unit according to claim 5, wherein the housing is configured to stop a detach movement of the conveyor module along its longitudinal direction by means of engaging with the conveyor module.

14. The docking unit according to claim 5, further comprising at least one guiding surface for laterally guiding the conveyor module during mounting into the docking unit.

15. The docking unit according to claim 5, further comprising a magnet for holding the conveyor module to the docking unit.

16. The docking unit according to claim 5, wherein the docking unit is configured to send electrical power and to receive/send electrical signals wirelessly.

17. The docking unit according to claim 5, further comprising a weigh cell configured to determine a weight of the conveyor module.

18. The docking unit according to claim 5, wherein the conveyor module comprises:
   at least one conveyor belt; and
   a conveyor module housing that supports the at least one conveyor belt,
   wherein the force receiving element receives the driving power for driving the at least one conveyor belt, and the force receiving element is accessible from outside of the conveyor module through an opening in the conveyor module housing.

19. The docking unit according to claim 5, further comprising a motor for driving the force feed element.

20. The docking unit according to claim 19, further comprising detection means for measuring a load of the motor and for asserting a pre-warning cleaning message based on the motor load.

21. A conveyor module docking system for a reverse vending machine, comprising a conveyor module according to claim 1, and a docking unit configured to detachably hold the conveyor module, the docking unit including:
   a docking unit housing; and
   a force feed element for outputting a driving power to a force receiving element of the conveyor module, and the force feed element is accessible due to an opening in the docking unit housing.

22. A reverse vending machine comprising a conveyor module docking system according to claim 21.

* * * * *